US012562505B2

(12) United States Patent
Jiang

(10) Patent No.: US 12,562,505 B2
(45) Date of Patent: Feb. 24, 2026

(54) ANTENNA STRUCTURE AND ELECTRONIC DEVICE

(71) Applicant: GUANGDONG OPPO MOBILE TELECOMMUNICATIONS CORP., LTD., Guangdong (CN)

(72) Inventor: Wenyu Jiang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 216 days.

(21) Appl. No.: 18/505,357

(22) Filed: Nov. 9, 2023

(65) Prior Publication Data

US 2024/0079796 A1 Mar. 7, 2024

Related U.S. Application Data

(63) Continuation of application No. PCT/CN2022/083091, filed on Mar. 25, 2022.

(30) Foreign Application Priority Data

May 11, 2021 (CN) ........................ 202110513133.9

(51) Int. Cl.
*H01Q 21/30* (2006.01)
*H01Q 1/50* (2006.01)

(52) U.S. Cl.
CPC ............... *H01Q 21/30* (2013.01); *H01Q 1/50* (2013.01)

(58) Field of Classification Search
CPC .......... H01Q 1/242; H01Q 1/50; H01Q 1/521; H01Q 21/28; H01Q 21/30; H01Q 5/20; H01Q 5/30
See application file for complete search history.

(56) References Cited

U.S. PATENT DOCUMENTS 10,439,267 B2 * 10/2019 Seo ........................ H01Q 1/243
11,024,947 B2 * 6/2021 Jung ..................... H04M 1/026
(Continued)

FOREIGN PATENT DOCUMENTS

CN 106450752 2/2017
CN 107221740 9/2017
(Continued)

OTHER PUBLICATIONS

CNIPA, First Office Action for CN Application No. 202110513133.9, Mar. 19, 2025.
(Continued)

*Primary Examiner* — Jason M Crawford
(74) *Attorney, Agent, or Firm* — Hodgson Russ LLP

(57) ABSTRACT

An electronic device includes a first antenna radiator, a second antenna radiator, a first feed source, and a second feed source. The first antenna radiator includes a first feed point and a first ground point. The second antenna radiator includes a second feed point and a second ground point. The first feed point is disposed at a side of the first ground point away from the second ground point, and the second feed point is disposed at a side of the second ground point away from the first ground point. The first feed source is electrically connected to the first feed point and is configured to provide a feed signal for the first antenna radiator. The second feed source is electrically connected to the second feed point and is configured to provide a feed signal for the second antenna radiator.

19 Claims, 7 Drawing Sheets

(56) References Cited

U.S. PATENT DOCUMENTS

| | | | | |
|---|---|---|---|---|
| 12,191,578 | B2 * | 1/2025 | Cai | H01Q 1/245 |
| 2016/0365623 | A1 * | 12/2016 | Kim | H01Q 9/42 |
| 2017/0048363 | A1 * | 2/2017 | Lee | H01Q 5/314 |
| 2018/0358699 | A1 * | 12/2018 | Li | H01Q 9/42 |
| 2019/0044218 | A1 * | 2/2019 | Ye | H01Q 5/50 |
| 2019/0067821 | A1 * | 2/2019 | Kim | H01Q 1/243 |
| 2019/0348750 | A1 * | 11/2019 | Lin | H01Q 9/42 |
| 2019/0393586 | A1 * | 12/2019 | Ayala Vazquez | H01Q 5/328 |
| 2020/0058983 | A1 * | 2/2020 | Chen | H01Q 1/243 |
| 2020/0058993 | A1 * | 2/2020 | Qiu | H01Q 5/30 |
| 2020/0321688 | A1 * | 10/2020 | Khripkov | H01Q 21/28 |
| 2020/0321988 | A1 * | 10/2020 | Kim | H04M 1/02 |
| 2021/0273340 | A1 * | 9/2021 | Sun | H01Q 1/36 |
| 2021/0305703 | A1 * | 9/2021 | Li | H01Q 9/0442 |
| 2021/0391656 | A1 * | 12/2021 | Chen | H01Q 21/28 |
| 2022/0140471 | A1 * | 5/2022 | Sun | H01Q 1/48 |
| | | | | 343/702 |
| 2022/0238998 | A1 * | 7/2022 | Jia | H04B 1/0458 |
| 2022/0311127 | A1 * | 9/2022 | Li | H01Q 21/28 |
| 2023/0006335 | A1 * | 1/2023 | Yang | H01Q 1/38 |
| 2023/0006336 | A1 * | 1/2023 | Yang | H01Q 9/30 |
| 2023/0006360 | A1 * | 1/2023 | Yang | H01Q 5/335 |
| 2023/0275345 | A1 * | 8/2023 | Liang | H01Q 5/328 |
| | | | | 343/700 R |
| 2023/0335922 | A1 * | 10/2023 | Wang | H01Q 5/307 |
| 2023/0344128 | A1 * | 10/2023 | Wu | H01Q 5/314 |
| 2023/0344129 | A1 * | 10/2023 | Wu | H01Q 5/357 |
| 2023/0344151 | A1 * | 10/2023 | Wu | H01Q 5/328 |
| 2023/0344152 | A1 * | 10/2023 | Wu | H01Q 9/42 |
| 2023/0352852 | A1 * | 11/2023 | Wu | H01Q 1/241 |
| 2023/0361467 | A1 * | 11/2023 | Wu | H01Q 21/28 |
| 2023/0361470 | A1 * | 11/2023 | Wu | H01Q 1/521 |
| 2023/0420846 | A1 * | 12/2023 | Wu | H01Q 21/30 |
| 2024/0014556 | A1 * | 1/2024 | Wu | H01Q 1/243 |
| 2024/0021998 | A1 * | 1/2024 | Wang | H01Q 5/335 |
| 2024/0072418 | A1 * | 2/2024 | Wu | H01Q 1/243 |
| 2024/0072440 | A1 * | 2/2024 | Wu | H01Q 5/378 |
| 2024/0079796 | A1 * | 3/2024 | Jiang | H01Q 1/521 |
| 2024/0113416 | A1 * | 4/2024 | Zhao | H01Q 9/42 |
| 2024/0154295 | A1 * | 5/2024 | Cai | H01Q 21/28 |

FOREIGN PATENT DOCUMENTS

| | | |
|---|---|---|
| CN | 107454214 | 12/2017 |
| CN | 108092009 | 5/2018 |
| CN | 108232421 | 6/2018 |
| CN | 108281766 | 7/2018 |
| CN | 108539379 | 9/2018 |
| CN | 108832313 | 11/2018 |
| CN | 109037918 | 12/2018 |
| CN | 109066105 | 12/2018 |
| CN | 208738425 | 4/2019 |
| CN | 211350963 | 8/2020 |
| CN | 112310622 | 2/2021 |
| CN | 112421210 | 2/2021 |
| CN | 112689033 | 4/2021 |
| CN | 112736432 | 4/2021 |
| WO | 2021082560 | 5/2021 |

OTHER PUBLICATIONS

WIPO, International Search Report and Written Opinion for International Application No. PCT/CN2022/083091, Jun. 16, 2022.

* cited by examiner

ANTENNA STRUCTURE AND ELECTRONIC DEVICE

CROSS-REFERENCE TO RELATED APPLICATION(S)

The application is a continuation of International Application No. PCT/CN2022/083091, filed Mar. 25, 2022, which claims priority to Chinese Patent Application No. 202110513133.9, filed May 11, 2021, the entire disclosures of which are incorporated herein by reference.

TECHNICAL FIELD

The disclosure relates to the field of wireless communications, and in particular, to an antenna structure for wireless communications and an electronic device having the antenna structure.

BACKGROUND

At present, 5$^{th}$ generation (5G) communication has been gradually popularized, and with the increase of 5G communication bands, the number of antenna radiators is increased compared to 4$^{th}$ generation (4G) long term evolution (LTE). However, at the same time, full-screens, curved-screens, etc. have now become mainstream. Due to the design requirements of the full-screens, curved-screens, etc., a clearance zone and available space have become increasingly limited, which leads some antenna radiators to be grounded at positions that are too close to each other. As a result, isolation between the antenna radiators is reduced, which causes interference between the antenna radiators, thereby adversely affecting performance of the antenna radiators.

SUMMARY

In one aspect, an electronic device is provided. The electronic device includes a first antenna radiator, a second antenna radiator, a first feed source, and a second feed source. The first antenna radiator includes a first feed point and a first ground point. The second antenna radiator includes a second feed point and a second ground point. The first ground point is adjacent to the second ground point, the first feed point is disposed at a side of the first ground point away from the second ground point, and the second feed point is disposed at a side of the second ground point away from the first ground point. The first feed source is electrically connected to the first feed point of the first antenna radiator and is configured to provide a feed signal for the first antenna radiator through the first feed point. The second feed source is electrically connected to the second feed point of the second antenna radiator and is configured to provide a feed signal for the second antenna radiator through the second feed point. The first ground point and the second ground point are both grounded. The first antenna radiator further includes a third ground point and a ground element. The third ground point is disposed between the first feed point and the first ground point, and the ground element is connected to the third ground point to be grounded.

In another aspect, an antenna structure is further provided. The antenna structure includes a first antenna radiator and a second antenna radiator. The first antenna radiator includes a first feed point and a first ground point. The second antenna radiator includes a second feed point and a second ground point. The first ground point is adjacent to the second ground point. The first feed point is disposed at a side of the first ground point away from the second ground point. The second feed point is disposed at a side of the second ground point away from the first ground point. The first antenna radiator further includes a third ground point and a ground element. The third ground point is disposed between the first feed point and the first ground point. The ground element is connected to the third ground point to be grounded.

BRIEF DESCRIPTION OF THE DRAWINGS

To describe technical solutions in implementations of the disclosure or the related art more clearly, the following briefly introduces the accompanying drawings required for describing the implementations or the related art. Apparently, the accompanying drawings in the following description only illustrate some implementations of the disclosure. Those of ordinary skill in the art may also obtain other drawings based on these accompanying drawings without creative efforts.

DETAILED DESCRIPTION

The technical solutions in the implementations of the disclosure are clearly and completely described in the following with reference to the accompanying drawings in the implementations of the disclosure. Apparently, the described implementations are merely part of rather than all of the implementations of the disclosure. All other implementations obtained by those of ordinary skill in the art based on the implementations of the disclosure without creative efforts are within the scope of the disclosure.

It is noted that, in the illustration of the implementations of the disclosure, orientation or position relationships indicated by terms such as "up", "down", "thickness", and "width" are based on accompanying drawings and are only for the convenience of illustration and simplicity, rather than explicitly or implicitly indicate that apparatuses or components referred to herein must have a certain orientation or be configured or operated in a certain orientation and therefore cannot be understood as limitation on the disclosure.

Figure 1:
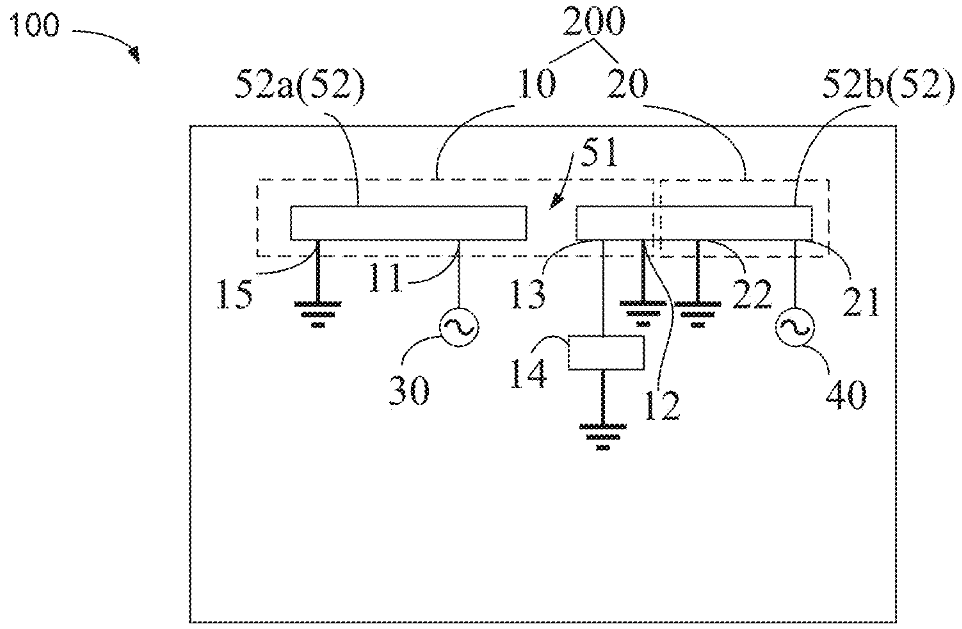
FIG. 1 is a schematic principle diagram of an electronic device according to an implementation of the disclosure.
Figure 2:
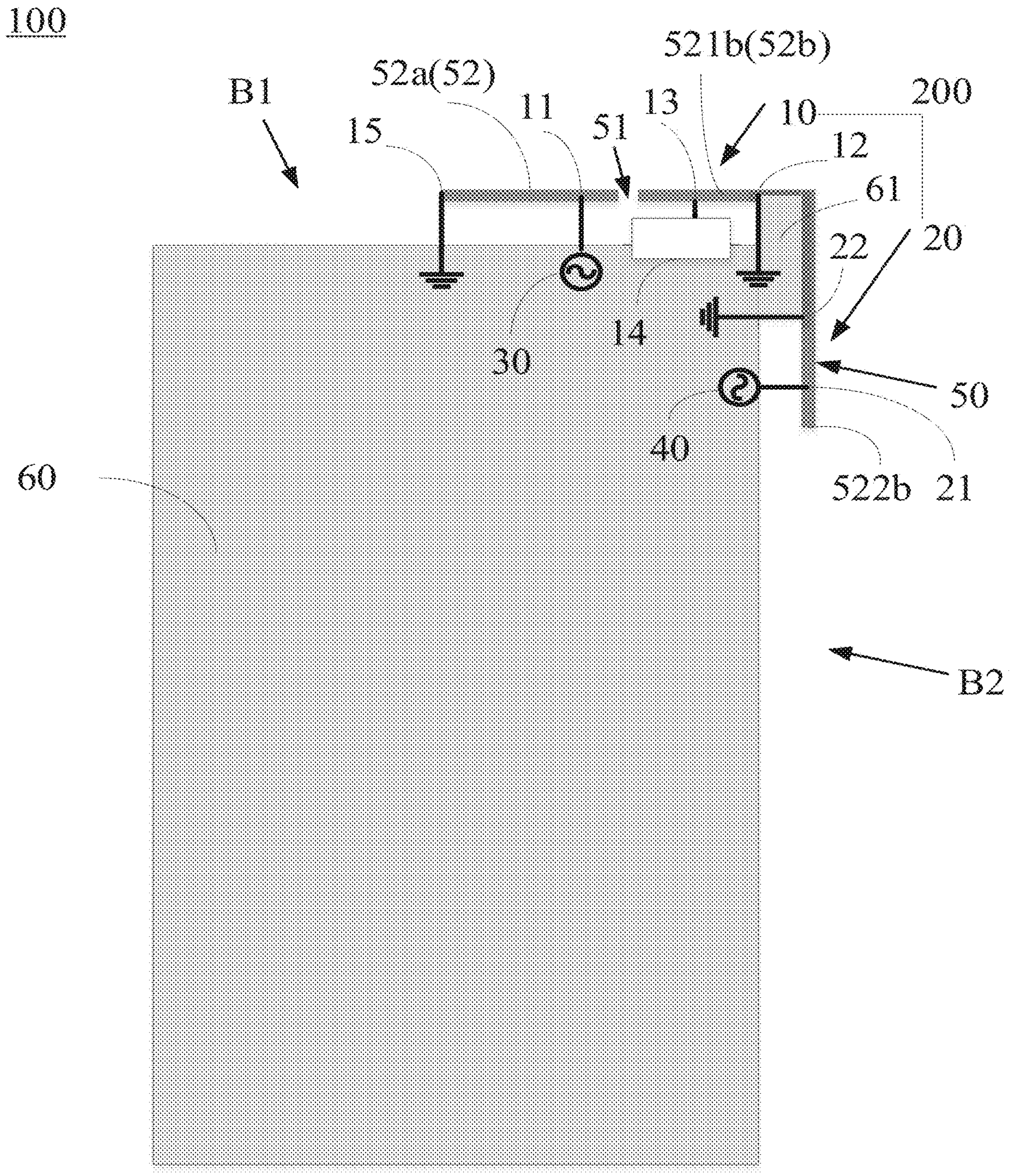
FIG. 2 is a schematic plan diagram of an electronic device according to an implementation of the disclosure.

Referring to FIGS. 1 and 2, FIG. 1 is a schematic principle diagram of an electronic device according to an implementationtation of the disclosure, and FIG. 2 is a schematic plan view of an electronic device 100 according to an implementation of the disclosure. As illustrated in FIGS. 1 and 2, the electronic device 100 includes an antenna structure 200. The antenna structure 200 includes a first antenna radiator 10 and a second antenna radiator 20. The first antenna radiator 10 includes a first feed point 11 and a first ground point 12. The second antenna radiator 20 includes a second feed point 21 and a second ground point 22. The first ground point 12 is adjacent to the second ground point 22. The first feed point 11 is disposed at a side of the first ground point 12 away from the second ground point 22. The second feed point 21 is disposed at a side of the second ground point 22 away from the first ground point 12.

The first antenna radiator 10 further includes a third ground point 13 and a ground element 14. The third ground point 13 is disposed between the first feed point 11 and the first ground point 12, and the ground element 14 is connected between the third ground point 13 and the ground.

As illustrated in FIGS. 1 and 2, the electronic device 100 further includes a first feed source 30 and a second feed source 40. The first feed source 30 is electrically connected to the first feed point 11 of the first antenna radiator 10 and is configured to provide a feed signal for the first antenna radiator 10 through the first feed point 11. The second feed source 40 is electrically connected to a second feed point 21 of the second antenna radiator 20 and is configured to provide a feed signal for the second antenna radiator 20 through the second feed point 21. The first ground point and the second ground point are both grounded.

Thus, in the disclosure, by adding the third ground point 13 and the ground element 14 between the first feed point 11 and the first ground point 12 to enable the first antenna radiator 10 to be grounded, a position where the first antenna radiator 10 is grounded can be changed, so that a distance between the position where the first antenna radiator 10 is grounded and a position where the second antenna radiator 20 is grounded is increased. Thus, isolation between the first antenna radiator 10 and the second antenna radiator 20 is improved, which reduces interference between the first antenna radiator 10 and the second antenna radiator 20, thereby improving performance of antenna radiators.

In a case where the third ground point 13 and the ground element 14 are absent in the first antenna radiator 10, the feed signal provided by the first feed source 30 is fed through the first feed point 11 and then grounded through the first ground point 12, the feed signal provided by the second feed source 40 is fed through the second feed point 21 and then grounded through the second ground point 22. Due to the compact layout of a large number of antenna radiators required for 5G communication, the first ground point 12 of the first antenna radiator 10 is adjacent to the second ground point 22 of the second antenna radiator 20, resulting in interference between the ground of the first antenna radiator 10 and the ground of the second antenna radiator 20. In the disclosure, the third ground point 13 and the ground element are added between the first feed point 11 and the first ground point 12, the third ground point 13 is farther away from the second ground point 22 than the first ground point 12, so that the distance between a position where the first antenna radiator 10 is grounded and a position where the second antenna radiator 20 is grounded is increased, thereby improving isolation between the first antenna radiator 10 and the second antenna radiator 20. The feed signal provided by the first feed source 30 is a feed current generated by the first feed source 30, and the feed signal provided by the second feed source 40 is a feed current generated by the second feed source 40.

Each of the first antenna radiator 10 and the second antenna radiator 20 is configured to support a first band, and the third ground point 13 that is grounded through the ground element 14 is configured to improve isolation between the first antenna radiator 10 and the second antenna radiator 20 when both the first antenna radiator 10 and the second antenna radiator 20 operate in the first band. That is, the isolation between the first antenna radiator 10 and the second antenna radiator 20, which both operate in the first band, is improved.

As illustrated in FIGS. 1 and 2, the first antenna radiator 10 further includes a fourth ground point 15 disposed at a side of the first feed point 11 away from the first ground point 12, and the first antenna radiator 10 is further configured to support a second band. A current path from the first feed point 11 to the third ground point 13 and the ground element 14 is configured to achieve transmission/reception of a radio frequency (RF) signal of the first band, and a current path from the first feed point 11 to the first ground point 12 and a current path from the first feed point 11 to the fourth ground point 15 are configured to achieve transmission/reception of an RF signal of the second band. That is, part of feed signals received at the first feed point 11 is grounded through the third ground point 13 and the ground element 14, so that the first antenna radiator 10 can resonate in the first band and thus achieve transmission/reception of an RF signal of the first band. Another part of the feed signals received at the first feed point 11 is further grounded through the first ground point 12 and the fourth ground point 15 respectively, so that the first antenna radiator 10 can resonate in the second band and thus achieve transmission/reception of an RF signal of the second band. In the second band, the feed signal/feed current received at the first feed point 11 is mainly grounded through the first ground point 12 and the fourth ground point 15, and is at least partially grounded through the third ground point 13 and the ground element 14, thereby achieving tuning/fine-tuning for the second band.

In the disclosure, the first band is a $5^{th}$ generation (5G) N78 band (i.e., an N78 band in a 5G non-standalone (NSA) communication mode), and the second band is a middle-high band (MHB). Apparently, in other implementations, the first band and the second band may be other bands.

A band supported by the second antenna radiator 20 may be the same as a band supported by the first antenna radiator 10, that is, the second antenna radiator 20 is further configured to support the second band. Thus, the second antenna radiator 20 is configured to support both the first band and the second band, that is, to support both the MHB and the 5G N78 band. A current path from the second feed point 21 to the second ground point 22 is configured to achieve transmission/reception of an RF signal of the first band and an RF signal of the second band. That is, a feed signal received at the second feed point 21 is grounded through the second ground point 22, so that the second antenna radiator 20 can resonate in both the first band and the second band, thereby achieving both transmission/reception of an RF signal of the first band and transmission/reception of an RF signal of the second band.

In the disclosure, improving the isolation between the first antenna radiator 10 and the second antenna radiator 20 refers to improving the isolation between the first antenna radiator 10 and the second antenna radiator 20 when both the first antenna radiator 10 and the second antenna radiator 20 operate in the first band, for example, the 5G N78 band.

The first ground point 12, the second ground point 22, and the fourth ground point 15 may each be grounded through an electrical connector, such as a wire, a flexible printed circuit (FPC), and a metal dome.

Figure 3:
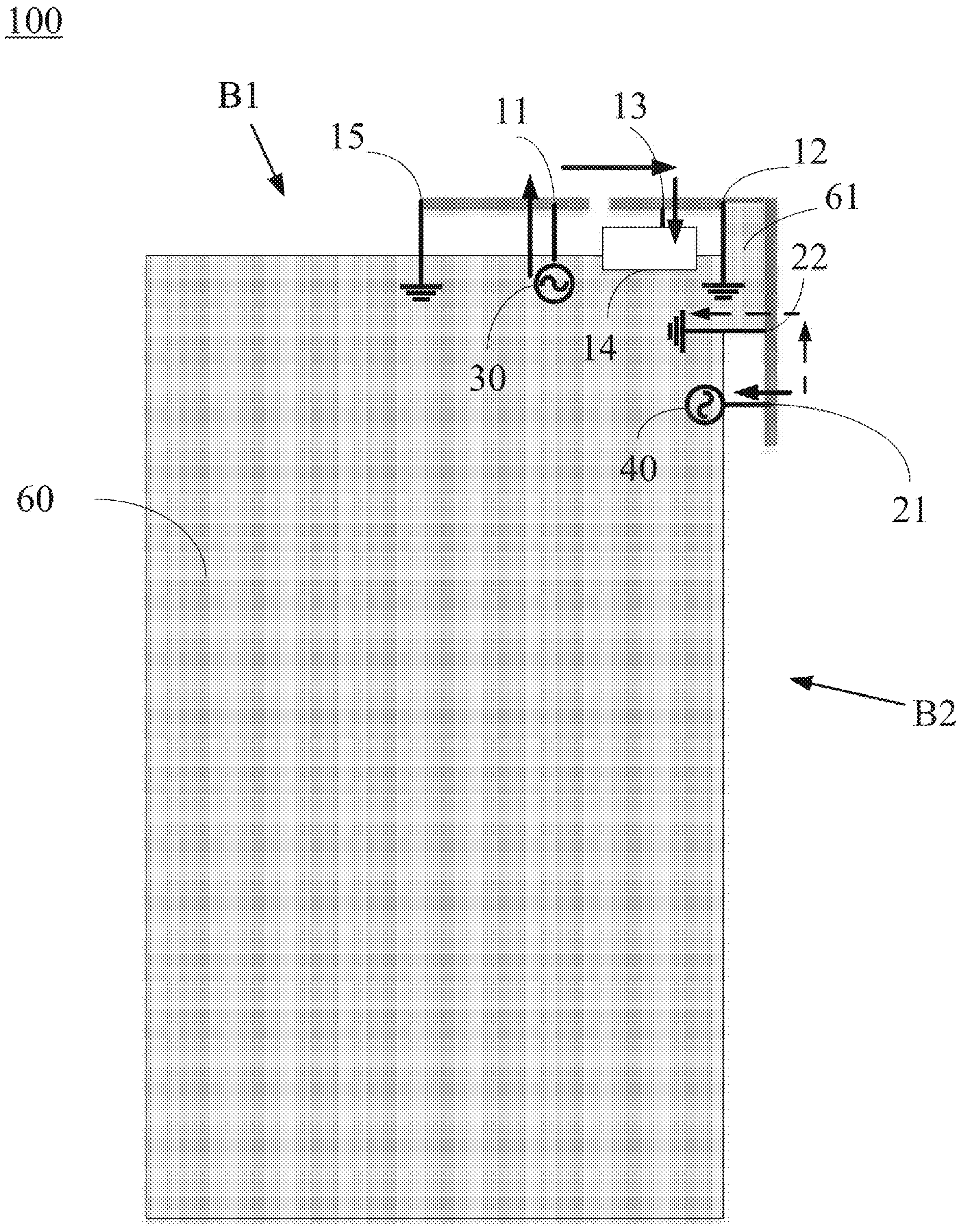
FIG. 3 is a schematic diagram illustrating current distribution when a second antenna radiator and a first antenna radiator of an electronic device operate in a first band according to an implementation of the disclosure.

Referring to FIG. 3, FIG. 3 is a schematic diagram illustrating current distribution when both the second antenna radiator 20 and the first antenna radiator 10 of the electronic device 100 operate in the first band. Transmission/reception of an RF signal of the first band (i.e., the 5G N78 band) is mainly achieved through a feed path from the first feed point 11 to the third ground point 13 and the ground element 14, and the feed path is grounded through the ground element 14. That is, in this case, a feed signal/feed current is transmitted from the first feed point 11 to the third ground point 13 and the ground element 14 and is grounded through the ground element 14, while a feed signal/feed current of the second antenna radiator 20 is transmitted from the second feed point 21 to the second ground point 22 and is grounded through the second ground point 22. The third ground point 13 is farther away from the second ground point 22 of the second antenna radiator 20 than the first ground point 12, so that when both the first antenna radiator 10 and the second antenna radiator 20 operate in the 5G N78 band, a distance between a position where the first antenna radiator 10 is grounded and a position where the second antenna radiator 20 is grounded is increased, which improves the isolation between the first antenna radiator 10 and the second antenna radiator 20.

As illustrated in FIGS. 1 and 2, a gap 51 is defined between the first feed point 11 and the third ground point 13 of the first antenna radiator 10, and the third ground point 13 is disposed between the gap 51 and the first ground point 12. A feed signal received at the first feed point 11 of the first antenna radiator 10 is coupled and transmitted to the third ground point 13 and/or the first ground point 12 in a coupling feed manner. "Coupling feed" refers to that the first frame section 52*a*, when excited by the first feed source 30, can couple energy to the second frame section 52*b* through electric/magnetic field coupling to excite the second frame section 52*b* to radiate signals, achieving electrical signal conduction between the first frame section 52*a* and the second frame section 52*b* even in the case where the first frame section 52*a* is not in direct contact/connection with the second frame section 52*b*. In the implementations of the disclosure, the first frame section 52*a* is capable of generating an electric field/magnetic field under the excitation of the first feed source 30. This electric field energy/magnetic field energy can be transferred through the gap 51 to the second frame section 52*b* to excite the second frame section 52*b* to generate a current. In other words, the second frame section 52*b* can also be referred to as a parasitic radiator of the first frame section 52*a*.

In some implementations, as illustrated in FIG. 2, the electronic device 100 includes a metal frame 50. The metal frame 50 defines at least one gap 51 to separate the metal frame 50 into at least one frame section 52.

Only part of the metal frame 50 is illustrated in FIG. 2, and as illustrated in FIGS. 1 and 2, the at least one frame section 52 includes at least a first frame section 52*a* and a second frame section 52*b* separated from the first frame section 52*a* by the gap 51. The first feed point 11 of the first antenna radiator 10 is disposed at a position of the first frame section 52*a* close to the second frame section 52*b*. The first ground point 12 and the third ground point 13 of the first antenna radiator 10 are respectively disposed at positions of the second frame section 52*b* that are close to the first frame section 52*a*. The second feed point 21 is disposed at a position of the second frame section 52*b* away from the first frame section 52*a*, and the second ground point 22 is disposed at the second frame section 52*b* and between the second feed point 21 and the first ground point 12.

As illustrated in FIG. 2, the first frame section 52*a* is straight and is at a first edge B1 of the electronic device 100, the second frame section 52*b* extends along both the first edge B1 and a second edge B2 of the electronic device 100 adjacent to the first edge B1. The second frame section 52*b* is in an inverted L shape.

The second frame section 52*b* includes a first frame sub-section 521*b* and a second frame sub-section 522*b*. The first frame sub-section 521*b* is part of the second frame section 52*b* at the first edge B1 of the electronic device 100, the second frame sub-section 522*b* is part of the second frame section 52*b* at the second edge B2 of the electronic device 100.

The first feed point 11 is disposed at a position of the first frame section 52*a* close to the second frame section 52*b* (i.e., the first frame sub-section 521*b*). The first feed source 30 is connected to the first feed point 11. The first ground point 12 and the third ground point 13 of the first antenna radiator 10 are disposed at the first frame sub-section 521*b*, and the first ground point 12 is closer to the first frame section 52*a* than the third ground point 13.

The second feed point 21 is disposed at a position of the second frame sub-section 522*b* away from the first frame sub-section 521*b*, and the second ground point 22 is disposed at a position of the second frame sub-section 522*b* close to the first frame sub-section 521*b*.

The first frame sub-section 521*b*, which is at the first edge B1 of the electronic device 100, of the second frame section 52*b* and the first frame section 52*a* serve as the first antenna radiator 10. The second frame sub-section 522*b* serves as the second antenna radiator 20.

When the second antenna radiator 20 receives a feed signal/feed current from the second feed source 40 at the second feed point 21, the feed signal/feed current is then transmitted through the second frame sub-section 522*b* to the second ground point 22, and finally grounded through the second ground point 22, thereby achieving transmission/reception of an RF signal of the first band and an RF signal of the second band. That is, the second antenna radiator 20 may achieve, under excitation of the feed signal generated by the second feed source 40, transmission/reception of an RF signal of the first band and an RF signal of the second band, for example, achieve transmission/reception of an RF signal of the MEM and an RF signal of the 5G N78 band.

In some implementations, the first edge B1 of the electronic device 100 is a short side, and the second edge B2 is a long side adjacent to the first edge B1. In some implementations, the first edge B1 is shorter than the second edge B2.

FIG. 2 is a schematic structural diagram illustrating only part of antenna radiators of the electronic device 100. The metal frame 50 further includes multiple other frame sections which are distributed at the first edge B1, a side opposite the first edge B1, the second edge B2, and a side opposite the second edge B2 and are separated by gaps. The antenna structure 200 further includes multiple other antenna radiators formed by the multiple other frame sections, which are not illustrated in the drawings because they are irrelevant to improvement of the disclosure.

Apparently, in other implementations, no gap may be defined between the first antenna radiator 10 and the second antenna radiator 20, and the first antenna radiator 10 and the second antenna radiator 20 share one radiator. For example, a feed point and a ground point of both the first antenna radiator 10 and the second antenna radiator 20 may be connected to the same frame section.

As illustrated in FIG. 2, the electronic device 100 further includes a middle frame 60. The middle frame 60 is a panel-shaped frame used for supporting a display screen (not illustrated) of the electronic device 100. The middle frame is made of a metal material, such as copper, iron, or a copper-iron alloy. The middle frame serves as a ground for the electronic device 100.

The first ground point 12, the second ground point 22, the third ground point 13, and the fourth ground point 15 are electrically connected to the middle frame 60 to be grounded. For example, the first ground point 12, the second ground point 22, and the fourth ground point 15 may be electrically connected to the middle frame 60 to be grounded through an electrical connector such as a wire, an FPC, or a metal dome, and the third ground point 13 may be electrically connected to the middle frame 60 to be grounded through the ground element 14.

As illustrated in FIG. 2, most of each edge of the middle frame 60 close to the metal frame 50 is removed to form a clearance zone, and small part of each edge of the middle frame 60 extends to the metal frame 50 and is in electrical contact with the metal frame 50 to serve as a ground point of a corresponding antenna radiator. In other words, part of each edge of the middle frame 60 close to the metal frame 50 is spaced apart from the metal frame 50 to form a clearance zone, and another part of each edge of the middle frame 60 extends to and is in electrical contact with the metal frame 50 to serve as a ground point of a corresponding antenna radiator. That is, the middle frame 60 is a square frame having four edges extending to positions substantially flush with four edges of the metal frame 50 before forming the clearance zone, and the clearance zone is formed by removing most of each edge of the middle frame 60 close to the metal frame 50 through cutting or the like to avoid affecting transmission/reception of RF signals of the antenna radiators formed by the metal frame 50, while some regions of the middle frame 60 are retained to be in electrical contact with the metal frame 50 to enable the antenna radiators to be grounded. For example, the middle frame 60 has at least one region extending to the metal frame 50, for example, a region 61 as illustrated in FIG. 2. The first ground point 12 of the first antenna radiator 10 and the second ground point 22 of the second antenna radiator 20 are in direct contact with and electrically connected to the region 61, or are in electrical contact/connection with the region 61 through an electrical connector such as an FPC or a metal dome, so that the first antenna radiator 10 and the second antenna radiator 20 can be grounded. That is, as illustrated in FIG. 2, the region 61 of the middle frame 60 extends to a position corresponding to the metal frame 50, for example, a lower side or an inner side of the metal frame 50. The first ground point 12 of the first antenna radiator 10 and the second ground point 22 of the second antenna radiator 20 are in direct contact with and electrically connected to the region 61 of the middle frame 60 to be grounded. Alternatively, the first ground point 12 of the first antenna radiator 10 and the second ground point 22 of the second antenna radiator 20 are in electrical connection with the region 61 of the middle frame 60 through an electrical connector such as an FPC or a metal dome to be grounded.

In some implementations, the metal frame 50 may be an exposed metal frame. That is, the metal material of the metal frame 50 is visible directly from the external appearance of the electronic device 100.

In other implementations, the metal frame 50 may also be a metal frame wrapped with a non-conductive material such as plastic that is formed through an in-mould integration process.

In a case where the metal frame 50 is a metal frame wrapped with a non-conductive material such as plastic, the metal frame 50 may define through holes at an inner side of the metal frame 50, the through holes extend through the non-conductive material to expose and allow feed points and ground points of antenna radiator formed by the metal frame 50 to be electrically connected to a corresponding feed source or ground, thereby achieving excitation of antenna radiators.

In some implementations, as illustrated in FIG. 2, the ground element 14 may be a switch, and the ground element 14 is a numerical control switch, for example, may be a controlled switch such as a metal oxide semiconductor (MOS) transistor or a triode that can be controlled to be on or off, thereby enabling the third ground point 13 to be grounded or not to be grounded. In some implementations, the ground element 14 may also be a matching element such as a capacitor, an inductor, or an LC parallel circuit. Alternatively, the ground element 14 may be a structure formed by a switch and a matching element that are connected in series.

Through a structure formed by a switch and a matching element that are connected in series, effective matching tuning can be performed according to requirements. For example, when the first antenna radiator 10 and the second antenna radiator 20 operate in the 5G N78 band, an isolation between the first antenna radiator 10 and the second antenna radiator 20 when the first antenna radiator 10 and the second antenna radiator 20 operate in the 5G N78 band can be improved by controlling the switch to be on. When the first antenna radiator 10 and the second antenna radiator 20 operate in the MHB, keeping the switch on allows further fine-adjusting for the MHB, such as adjusting an operating frequency in the MHB, thereby enhancing a performance of the first antenna radiator 10 in the MHB. When the first antenna radiator 10 and the second antenna radiator 20 operate in the 5G N78 band, controlling the switch to be on not only improves the isolation between the first antenna radiator 10 and the second antenna radiator 20 in the 5G N78 band but also allows further fine-tuning for the 5G N78 band. In other implementations, the ground element 14 may also be an electrical connector such as a wire, an FPC, or a metal dome.

That is, in some implementations, the ground element 14 may be at least one of a switch, a capacitor, an inductor, a wire, an FPC, and a metal dome.

Figure 4:
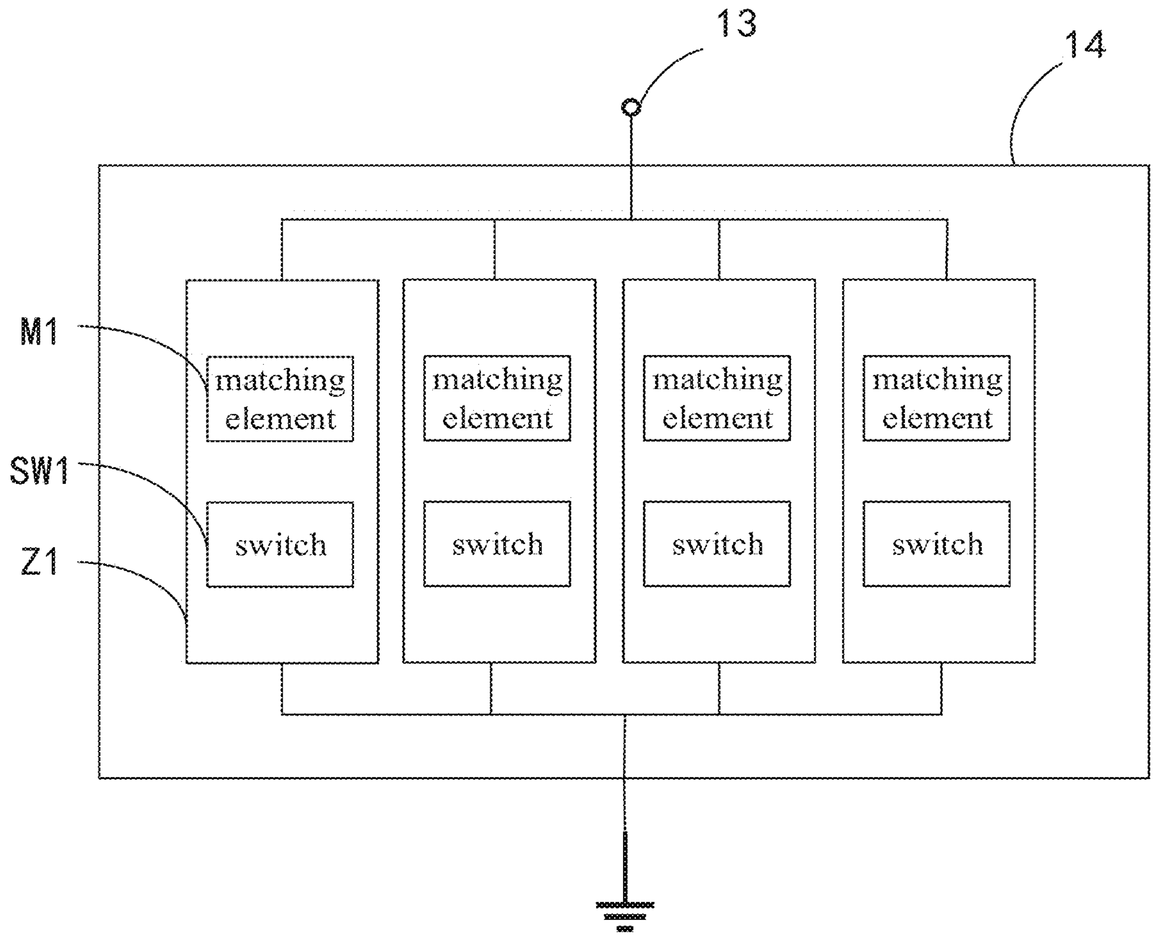
FIG. 4 is a schematic diagram of a ground element of an electronic device according to an implementation of the disclosure.

Referring to FIG. 4, FIG. 4 is a schematic diagram of a ground element 14 according to an implementation of the disclosure. As illustrated in FIG. 4, the ground element 14 includes multiple matching-element branches Z1 connected in parallel, each of the multiple matching-element Z1 branches includes a matching element M1 and a switch SW1 connected in series. The matching element M1 of each of the multiple matching branches Z1 is different from the matching element M1 of each of the other of the multiple matching branches Z1 in at least one of a type or a parameter. By controlling on/off of switches of the multiple matching-element branches Z1, different matching-element branches in the multiple matching-element branches are selected to operate to adjust/fine-adjust a frequency point of an operating band of the first antenna radiator 10.

Figure 5:
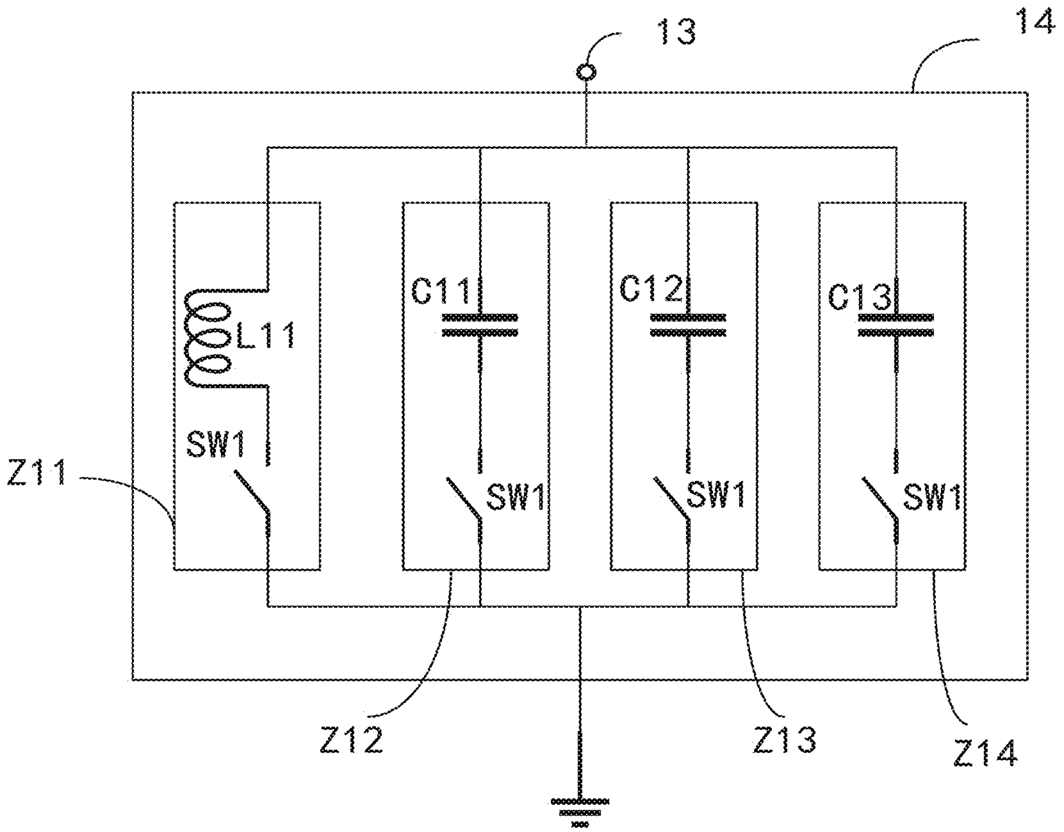
FIG. 5 is an exemplary diagram of a ground element of an electronic device according to an implementation of the disclosure.

Referring to FIG. 5, FIG. 5 is an exemplary diagram of the ground element 14 according to an implementation of the disclosure. As illustrated in FIG. 5, in some implementations, the ground element 14 includes a first inductance matching branch Z11, a first capacitance matching branch Z12, a second capacitance matching branch Z13, and a third capacitance matching branch Z14 connected in parallel between the third ground point 13 and the ground. The first inductance matching branch Z11 includes a first matching inductor L11 and a switch SW1 connected in series. The first capacitance matching branch Z12 includes a first matching capacitor C11 and a switch SW1 connected in series. The second capacitance matching branch Z13 includes a second matching capacitor C12 and a switch SW1 connected in series. The third capacitance matching branch Z14 includes a third matching capacitor C13 and a switch SW1 connected in series.

The first matching capacitor C11, the second matching capacitor C12, and the third matching capacitor C13 are different from one another in capacitance value. Thus, because the first inductance matching branch Z11, the first capacitance matching branch Z12, the second capacitance matching branch Z13, and the third capacitance matching branch Z14 are different from one another in type or parameter, when different matching branches are turned on or different combinations of matching branches are turned on, different matching parameters are generated, thereby achieving resonance matching of different bands.

Figure 6:
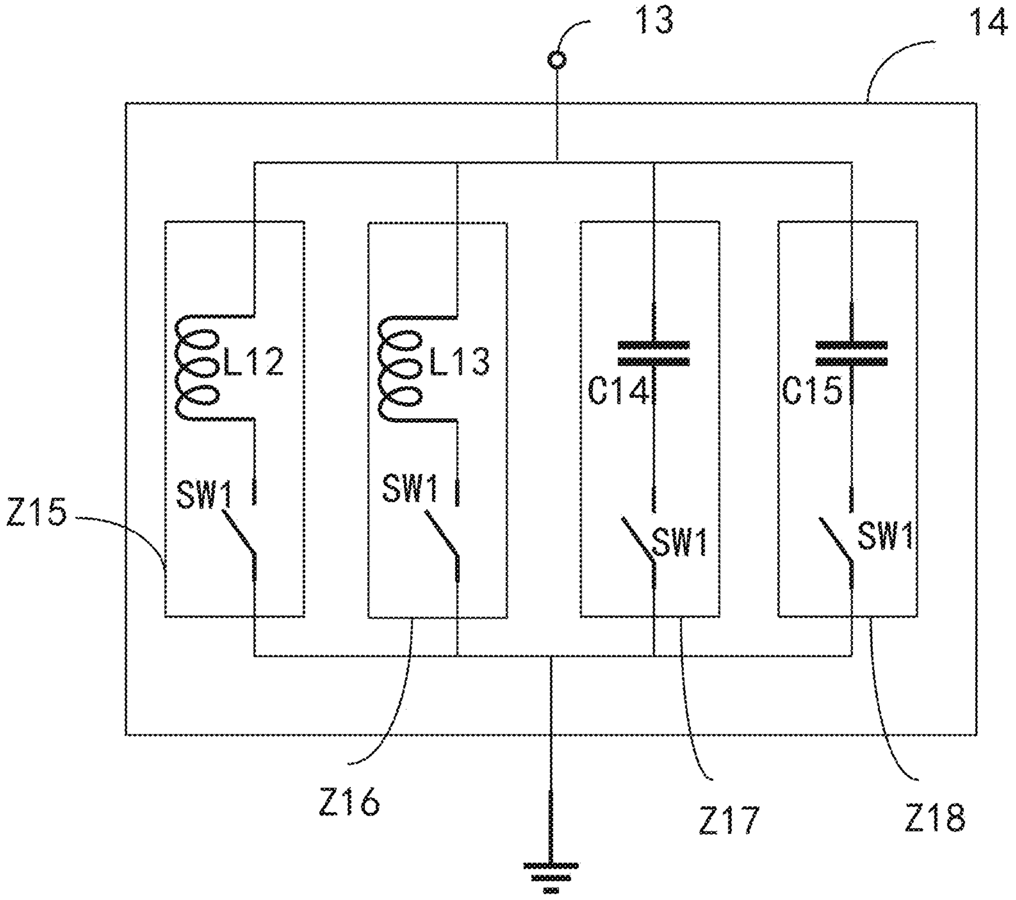
FIG. 6 is an exemplary diagram of a ground element of an electronic device according to another implementation of the disclosure.

Referring to FIG. 6, FIG. 6 is an exemplary diagram of the ground element 14 according to another implementation of the disclosure. As illustrated in FIG. 6, the ground element 14 includes a second inductance matching branch Z15, a third inductance matching branch Z16, a fourth capacitance matching branch Z17, and a fifth capacitance matching branch Z18 connected in parallel between the third ground point 13 and the ground. The second inductance matching branch Z15 includes a second matching inductor L12 and a switch SW1 connected in series. The third inductance matching branch Z16 includes a third matching inductor L13 and a switch SW1 connected in series. The fourth capacitance matching branch Z17 includes a fourth matching capacitor C14 and a switch SW1 connected in series. The fifth capacitance matching branch Z18 includes a fifth matching capacitor C15 and a switch SW1 connected in series.

An inductance value of the second matching inductor L12 is different from that of the third matching inductor L13, and a capacitance value of the fourth matching capacitor C14 is different from that of the fifth matching capacitor C15. Thus, when different matching branches are turned on or different combinations of matching branches are turned on, different matching parameters are generated, thereby achieving resonance matching of different bands.

In some implementations, the switch SW1 is a digital control switch, for example, may be a MOS transistor, a bipolar junction transistor (BJT) triode, or the like.

Figure 7:
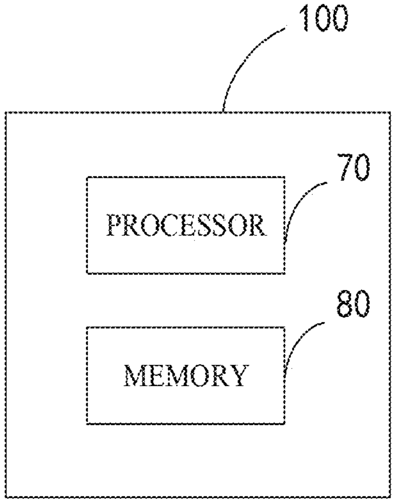
FIG. 7 is a functional block diagram illustrating some components of an electronic device according to an implementation of the disclosure.

Referring to FIG. 7, FIG. 7 is a functional block diagram illustrating some components of an electronic device 100. The electronic device 100 further includes a processor 70 and a memory 80 besides the antenna structure 200, the first feed source 30, the second feed source 40, the metal frame 50, and the middle frame 60. The memory 80 may store corresponding relationships between various frequency points of the first band and the second band that are supported by the first antenna radiator 10 and switch control logic of a switch.

The processor 2 may include multiple output control terminals. The multiple output control terminals may be separately connected to controlled terminals of all of the switches SW1 of the ground element 14 in a one-to-one correspondence. For example, in a case where the switch SW1 of the ground element 14 is an MOS transistor, the multiple output control terminals of the processor 2 may be separately connected to gates of all of the MOS transistors of the ground element 14. The processor 2 may determine the switch control logic according to current tuning requirements, then control each output control terminal to output a corresponding level signal to a controlled terminal of a corresponding switch SW1 in the ground element 14, and thus control multiple switches SW1 of at least one switch to be correspondingly turned on or turned off.

For example, the processor 2 may be configured to, according to a current band in which the first antenna radiator 10 operates and an application currently running on the electronic device 100, determine a frequency point of the current band to which the first antenna radiator 10 needs to be tuned, and then determine corresponding switch control logic according to the corresponding relationships stored in the memory 80. The corresponding switch control logic determined is used to determine the multiple switches SW1 of the ground element 14 to be correspondingly turned on or turned off, so that the ground element 14 can be adjusted to a corresponding matching parameter, thereby tuning the first antenna radiator 10 to a corresponding frequency point of the first band or a corresponding frequency point of the second band. In the disclosure, the frequency point refers to a resonance center frequency of a corresponding band. By tuning the frequency point, resonance can be maximized, and antenna radiation performance is optimal.

For example, when the first antenna radiator 10 currently operates in the first band (i.e., the MHB) and a currently running application is news browsing, the processor 2 may determine that the first antenna radiator 10 needs to be tuned to a first frequency point of the first band. When the currently running application is a voice call application, the processor 2 may determine that the first antenna radiator 10 needs to be tuned to a second frequency point of the first band. The above illustration is only an example to illustrate that a frequency point to which the first antenna radiator 10 needs to be tuned may vary depend on an application currently running.

Thus, in the disclosure, the ground element 14 includes multiple matching-element branches Z1 connected in parallel, each matching-element branch includes the matching element M1 and the switch SW1 connected in series, and the matching element M1 of each of the multiple matching branches Z1 is different from the matching element M1 of each of the other of the multiple matching branches Z1 in at least one of a type or a parameter, it not only improves the isolation between the first antenna radiator 10 and the second antenna radiator 20 when the first antenna radiator 10 and the second antenna radiator 20 operate in the 5G N78 band, but also allows further tuning for the 5G N78 band and the MHB.

Figure 8:
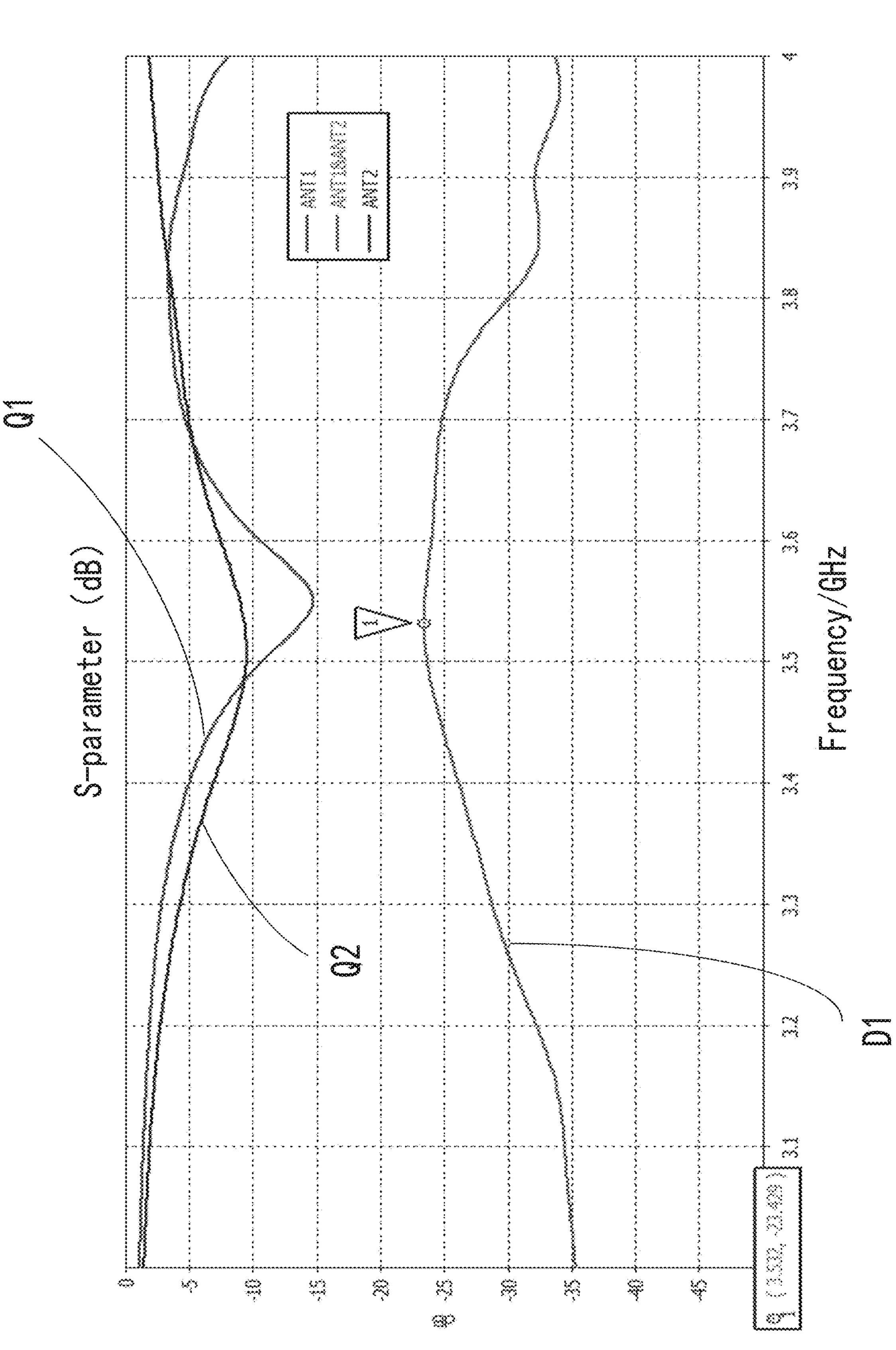
FIG. 8 is a schematic diagram illustrating isolation between a first antenna radiator and a second antenna radiator when the first antenna radiator and the second antenna radiator operate in a first band according to an implementation of the disclosure.

Referring to FIG. 8, FIG. 8 is a schematic diagram illustrating isolation between the first antenna radiator and the second antenna radiator when the first antenna radiator and the second antenna radiator operate in the second band (i.e., the 5G N78 band) according to an implementation of the disclosure.

As illustrated in FIG. 8, during operation of the first antenna radiator 10 and the second antenna radiator 20 in the 5G N78 band, the isolation D1 between the first antenna radiator 10 and the second antenna radiator 20 is substantially less than −23 dB, the isolation is relatively high, and the interference between the first antenna radiator 10 and the second antenna radiator 20 is substantially low, thereby effectively reducing the interference. From a resonance curve Q1 of the first antenna radiator 10 and a resonance curve Q2 of the second antenna radiator 20 in FIG. 7, it can be seen that magnitudes of S-parameters (especially return losses) of the first antenna radiator 10 and the second antenna radiator 20 are about −15 dB and −10 dB, respectively, and, in fact, the efficiency of the first antenna radiator 10 and the second antenna radiator 20 is also effectively improved. That is, the first antenna radiator 10 and the second antenna radiator 20 have not only maintained their performance but even experienced certain improvements, such as 0.3-0.5 dB improvement, due to the improved isolation.

The electronic device 100 further includes other elements, such as a rear housing, a camera, and the like, which are unrelated to improvements of the disclosure, and therefore are not further described.

The electronic device 100 involved in the implementations of the disclosure may include various electronic devices provided with antenna radiators, such as a handheld device (such as a mobile phone and a tablet computer), an on-board device, a wearable device, a computing device or other processing devices connected to a wireless modem, various forms of user equipment (UE), and a mobile station (MS). For ease of illustration, the devices described above are collectively referred to as electronic devices.

Thus, in the disclosure, by adding the third ground point 13 and the ground element 14 between the first feed point 11 and the first ground point 12, a position where the first antenna radiator 10 is grounded can be changed, so that a distance between the position where the first antenna radiator 10 is grounded and a position where the second antenna radiator 20 is grounded can be increased. Thus, isolation between the first antenna radiator 10 and the second antenna radiator 20 is improved, which reduces interference between the first antenna radiator 10 and the second antenna radiator 20, thereby improving performance of antenna radiators.

In the foregoing implementations, illustration of each implementation has its own emphasis. For the parts not described in detail in one implementation, reference may be made to related illustrations in other implementations.

The implementations of the disclosure are described in detail above, specific examples are used herein to describe the principles and implementation manners of the disclosure. The illustration of the above implementations is merely used to help understand the method and the core idea of the disclosure. Meanwhile, those skilled in the art may make modifications to the specific implementation manners and the application scope according to the idea of the disclosure. In summary, the contents of the specification should not be construed as limiting the disclosure.

What is claimed is:

1. An electronic device comprising:

a first antenna radiator, a second antenna radiator, a first feed source, and a second feed source, wherein:

the first antenna radiator comprises a first feed point and a first ground point, and the second antenna radiator comprises a second feed point and a second ground point, wherein the first feed point is disposed at a side of the first ground point away from the second ground point, and the second feed point is disposed at a side of the second ground point away from the first ground point;

the first feed source is electrically connected to the first feed point of the first antenna radiator and is configured to provide a feed signal for the first antenna radiator through the first feed point, the second feed source is electrically connected to the second feed point of the second antenna radiator and is configured to provide a feed signal for the second antenna radiator through the second feed point, and the first ground point and the second ground point are both grounded;

the first antenna radiator further comprises a third ground point and a ground element, wherein the third ground point is disposed between the first feed point and the first ground point, and the ground element is connected to the third ground point to be grounded; and each of the first antenna radiator and the second antenna radiator is configured to support a first band, and the third ground point that is grounded through the ground element is configured to improve isolation between the first antenna radiator and the second antenna radiator when both the first antenna radiator and the second antenna radiator operate in the first band.

2. The electronic device of claim 1, wherein the first antenna radiator further comprises a fourth ground point disposed at a side of the first feed point away from the first ground point, and the first antenna radiator is further configured to support a second band, wherein a current path from the first feed point to the first ground point and a current path from the first feed point to the fourth ground point are configured to achieve transmission/reception of a radio frequency (RF) signal of the second band, and a current path from the first feed point to the third ground point and the ground element is configured to achieve transmission/reception of an RF signal of the first band.

3. The electronic device of claim 2, wherein the second antenna radiator is further configured to support the second band, and a current path from the second feed point to the second ground point is configured to achieve transmission/reception of an RF signal of the first band and an RF signal of the second band.

4. The electronic device of claim 3, wherein the first band is a $5^{th}$ generation (5G) N78 band, and the second band is a middle-high band (MHB).

5. The electronic device of claim 1, further comprising a metal frame, wherein the metal frame defines at least one gap to separate the metal frame into at least one frame section, wherein the at least one frame section comprises at least a first frame section and a second frame section adjacent to the first frame section and separated from the first frame section by the gap, wherein the first feed point is disposed at a position of the first frame section close to the second frame section, the first ground point and the third ground point of the first antenna radiator are respectively disposed at positions of the second frame section that are close to the first frame section, the second feed point is disposed at a position of the second frame section away from the first frame section, and the second ground point is disposed at the second frame section and between the second feed point and the first ground point.

6. The electronic device of claim 5, wherein:

the first frame section is straight and is at a first edge of the electronic device, the second frame section extends along both the first edge and a second edge of the electronic device adjacent to the first edge; the second frame section comprises a first frame sub-section and a second frame sub-section, wherein the first frame sub-section is part of the second frame section at the first edge of the electronic device, the second frame sub-section is part of the second frame section at the second edge of the electronic device;

the first feed point is disposed at a position of the first frame section close to the first frame sub-section, the first ground point and the third ground point of the first antenna radiator are disposed at the first frame sub-section, and the first frame section and the first frame sub-section serve as the first antenna radiator; and the second feed point is disposed at a position of the second frame sub-section away from the first frame sub-section, the second ground point is disposed at a position of the second frame sub-section close to the first frame sub-section, and the second frame sub-section serves as the second antenna radiator.

7. The electronic device of claim 6, wherein the first edge of the electronic device is a short edge of the electronic device, and the second edge is a long edge adjacent to the first edge.

8. The electronic device of claim 5, further comprising a middle frame, wherein the middle frame is made of a metal material and is configured to serve as a ground for the electronic device, and the first ground point, the second ground point, and the third ground point are electrically connected to the middle frame to be grounded.

9. The electronic device of claim 8, wherein part of each edge of the middle frame close to the metal frame is spaced apart from the metal frame to form a clearance zone, and another part of each edge of the middle frame extends to and is in electrical contact with the metal frame to serve as a ground point of a corresponding antenna radiator.

10. The electronic device of claim 9, wherein the first ground point of the first antenna radiator and the second ground point of the second antenna radiator are in direct contact with a region of the middle frame that extends to the metal frame to be grounded; or the first ground point of the first antenna radiator and the second ground point of the second antenna radiator are in electrical contact with the region of the middle frame that extends to the metal frame through electrical connectors to be grounded.

11. The electronic device of claim 5, wherein the metal frame is an exposed metal frame, or is a metal frame wrapped with a non-conductive material that is formed through an in-mould integration process.

12. The electronic device of claim 1, wherein the ground element comprises at least one of a switch, a capacitor, an inductor, a conducting wire, a flexible printed circuit (FPC), and a metal dome.

13. The electronic device of claim 1, wherein the ground element comprises a plurality of matching-element branches connected in parallel, each of the plurality of matching-element branches comprises a matching element and a switch connected in series, and the matching element of each of the plurality of matching branches is different from the matching element of each of the other of the plurality of matching branches in at least one of a type or a parameter; by controlling on/off of switches of the plurality of matching-element branches, different matching-element branches in the plurality of matching-element branches are selected to operate to adjust a frequency point of an operating band of the first antenna radiator.

14. An antenna structure, comprising:

a first antenna radiator and a second antenna radiator, wherein:

the first antenna radiator comprises a first feed point and a first ground point, and the second antenna radiator comprises a second feed point and a second ground point, wherein the first feed point is disposed at a side of the first ground point away from the second ground point, and the second feed point is disposed at a side of the second ground point away from the first ground point;

the first antenna radiator further comprises a third ground point and a ground element, wherein the third ground point is disposed between the first feed point and the first ground point, and the ground element is connected to the third ground point to be grounded; and each of the first antenna radiator and the second antenna radiator is configured to support a first band, and the third ground point that is grounded through the ground element is configured to improve isolation between the first antenna radiator and the second antenna radiator when both the first antenna radiator and the second antenna radiator operate in the first band.

15. The antenna structure of claim 14, wherein the first antenna radiator further comprises a fourth ground point disposed at a side of the first feed point away from the first ground point, and the first antenna radiator is further configured to support a second band, wherein a current path from the first feed point to the first ground point and a current path from the first feed point to the fourth ground point are configured to achieve transmission/reception of an RF signal of the second band, and a current path from the first feed point to the third ground point and the ground element is configured to achieve transmission/reception of an RF signal of the first band.

16. The antenna structure of claim 15, wherein the second antenna radiator is further configured to support the second band, and a current path from the second feed point to the second ground point is configured to achieve transmission/reception of an RF signal of the first band and an RF signal of the second band.

17. The antenna structure of claim 16, wherein the first band is a 5G N78 band, and the second band is a MHB.

18. The antenna structure of claim 14, wherein:

the ground element comprises a plurality of matching-element branches connected in parallel, each of the plurality of matching-element branches comprises a matching element and a switch connected in series, and the matching element of each of the plurality of matching branches is different from the matching element of each of the other of the plurality of matching branches in at least one of a type or a parameter; and by controlling on/off of switches of the plurality of matching-element branches, different matching-element branches in the plurality of matching-element branches are selected to operate to adjust a frequency point of an operating band of the first antenna radiator.

19. An electronic device comprising:

a first antenna radiator, a second antenna radiator, a first feed source, and a second feed source, wherein:

the first antenna radiator comprises a first feed point and a first ground point, and the second antenna radiator comprises a second feed point and a second ground point, wherein the first feed point is disposed at a side of the first ground point away from the second ground point, and the second feed point is disposed at a side of the second ground point away from the first ground point;

the first feed source is electrically connected to the first feed point of the first antenna radiator and is configured to provide a feed signal for the first antenna radiator through the first feed point, the second feed source is electrically connected to the second feed point of the second antenna radiator and is configured to provide a feed signal for the second antenna radiator through the second feed point, and the first ground point and the second ground point are both grounded;

the first antenna radiator further comprises a third ground point and a ground element, wherein the third ground point is disposed between the first feed point and the first ground point, and the ground element is connected to the third ground point to be grounded; and the first antenna radiator further comprises a fourth ground point disposed at a side of the first feed point away from the first ground point, and the first antenna radiator is configured to support a second band, wherein a current path from the first feed point to the first ground point and a current path from the first feed point to the fourth ground point are configured to achieve transmission/reception of a radio frequency (RF) signal of the second band, and a current path from the first feed point to the third ground point and the ground element is configured to achieve transmission/reception of an RF signal of a first band.

* * * * *